US007755619B2

(12) United States Patent
Wang et al.

(10) Patent No.: US 7,755,619 B2
(45) Date of Patent: Jul. 13, 2010

(54) AUTOMATIC 3D FACE-MODELING FROM VIDEO

(75) Inventors: Qiang Wang, Beijing (CN);
Heung-Yeung Shum, Bellevue, WA (US); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 11/465,369

(22) Filed: Aug. 17, 2006

(65) Prior Publication Data
US 2007/0091085 A1  Apr. 26, 2007

Related U.S. Application Data

(60) Provisional application No. 60/727,024, filed on Oct. 13, 2005.

(51) Int. Cl.
*G06T 15/00* (2006.01)
(52) U.S. Cl. ................. 345/419; 345/423; 345/426; 345/427; 382/108; 382/154; 703/2
(58) Field of Classification Search ............ 345/419, 345/423, 426, 427; 382/108, 154; 703/2
See application file for complete search history.

(56) References Cited

U.S. PATENT DOCUMENTS 7,218,774 B2 *  5/2007  Liu .......................... 382/154
7,415,152 B2 *  8/2008  Jiang et al. ................ 382/154
7,426,292 B2 *  9/2008  Moghaddam et al. ....... 382/154
7,433,807 B2 * 10/2008  Marschner et al. ............. 703/2
7,440,590 B1 * 10/2008  Hassebrook et al. ........ 382/108

OTHER PUBLICATIONS

Fuchs et al., Reflectance from Images: a Model-based Approach for Human Faces, IEEE, Transaction on Visualization and Computer Graphics, Vo. 11, No. 3, May 2005; pp. 296-305.*
Choi et al., 3D Face Fitting using Multi-stage Parameter Updating in the 3D Morphable Face Model, Tenth IEEE International Symposium on Multimedia, Dec. 2008, pp. 274-279.*
Blantz et al., Face Identification across Different Poses and Illuminations with a 3D Morphable Model, Digital Object Identification, May 2002, pp. 192-197.*
Dimitrijevic et al., Accurate Face Models from Uncalibrated and Ill-Lit Video Sequences; Processding IEEE CVPR, Jun. 2004, pp. 188-202.*

* cited by examiner

*Primary Examiner*—Phu Nguyen
(74) *Attorney, Agent, or Firm*—Lee & Hayes, PLLC

(57) ABSTRACT

Systems and methods perform automatic 3D face modeling. In one implementation, a brief video clip of a user's head turning from front to side provides enough input for automatically achieving a model that includes 2D feature matches, 3D head pose, 3D face shape, and facial textures. The video clip of the user may be of poor quality. In a two layer iterative method, the video clip is divided into segments. Flow-based feature estimation and model-based feature refinement are applied recursively to each segment. Then the feature estimation and refinement are iteratively applied across all the segments. The entire modeling method is automatic and the two layer iterative method provides speed and efficiency, especially when sparse bundle adjustment is applied to boost efficiency.

20 Claims, 9 Drawing Sheets

AUTOMATIC 3D FACE-MODELING FROM VIDEO

RELATED APPLICATIONS

This application claims priority to U.S. Provisional Patent Application No. 60/727,024 to Wang et al., entitled "Automatic 3D Face Modeling From Video," filed on Oct. 13, 2005, and incorporated herein by reference.

BACKGROUND

Accurate face-modeling has extensive applications in areas such as human computer interaction, multimedia, and face recognition. In recent years, a number of approaches have been proposed for 3D face-modeling from images. For example, large angle multiple views have been conventionally used for accurately recovering shape information. But such systems are manually intensive and far from flexible, since the user has to manually specify point matching and feature correspondences across multiple images.

One approach is based on a morphable 3D face model. The approach obtains face model reconstruction from a single image, which demonstrates the advantage of using models of the linear class. Because of the sensitivity of the texture descriptor to illumination change, however, the quality of shape reconstruction degrades with uncontrolled illumination. The texture descriptor can be replaced by pair-wise point matching to somewhat increase robustness to illumination change.

Model-based bundle adjustment techniques enhance results. In model-based bundle adjustment, prior model knowledge is included into the traditional bundle adjustment. When applied to face-modeling, the 3D shape can be reliably recovered, but relies on a sparse face mesh structure, which is not a sufficient representation of real face geometry. A similar bundle adjustment procedure is based on the sophisticated PCA model learned from real 3D face data. Given pair-wise feature correspondences as input, the approach is robust to uncontrolled lighting conditions. The precision of the reconstructed face model can be predicted as a function of the number and quality of the correspondences.

However, the computational complexity of the above technique increases cubically with the number of frames being processed, which makes it infeasible for processing a relatively long video sequence. In addition, the approach depends on the quality of point matching between adjacent frames, which is unreliable in low quality video. What is needed is an efficient technique for automatic recovery of accurate 3D face models from videos captured by a low cost camera.

SUMMARY

Systems and methods perform automatic 3D face modeling. In one implementation, a brief video clip of a user's head turning from front to side provides enough input for automatically achieving a model that includes 2D feature matches, 3D head pose, 3D face shape, and facial textures. The video clip of the user may be of poor quality. In a two layer iterative method, the video clip is divided into segments. Flow-based feature estimation and model-based feature refinement are applied recursively to each segment. Then the feature estimation and refinement are iteratively applied across all the segments. The entire modeling method is automatic and the two layer iterative method provides speed and efficiency, especially when sparse bundle adjustment is applied to boost efficiency.

This summary is provided to introduce simplified features and concepts of virtual controllers for visual displays, which is further described below in the Detailed Description. This summary is not intended to identify essential features of the claimed subject matter, nor is it intended for use in determining the scope of the claimed subject matter.

DETAILED DESCRIPTION

Overview

This disclosure describes systems and methods for automatically obtaining an accurate 3-dimensional (3D) face model from a video sequence. Exemplary systems provide an important tool for 3D video games. Applications include modeling the game player's face in 3D and then embedding the player's face into the game to add player immersion. Moreover, a resulting 3D face model and texture can be used in face recognition technology.

In one implementation, an exemplary method takes a video sequence ("clip") that contains a face that is rotating from a frontal view to a profile (sideways) view, as an input. This video clip of a user may be obtained even under poor illumination conditions by an inexpensive camera, such as a low-cost webcam or a USB camera, and may include a reasonable degree of noise. An automatic initialization then obtains a rough initial face pose. Next, the video clip is segmented and in each segment an exemplary two layer iterative technique is applied to simultaneously estimate and refine 2-dimensional (2D) feature matching, 3D head pose, and the underlying 3D face shape in an efficient manner. Finally, all the estimated information in each segment is iteratively propagated over all segments to estimate the final 3D face shape for frames of the video clip, using sparse bundle adjustment to boost efficiency. The exemplary system achieves an accurate 3D face model automatically, which has been a longstanding challenge for conventional techniques.

Exemplary Environment

Figure 1:
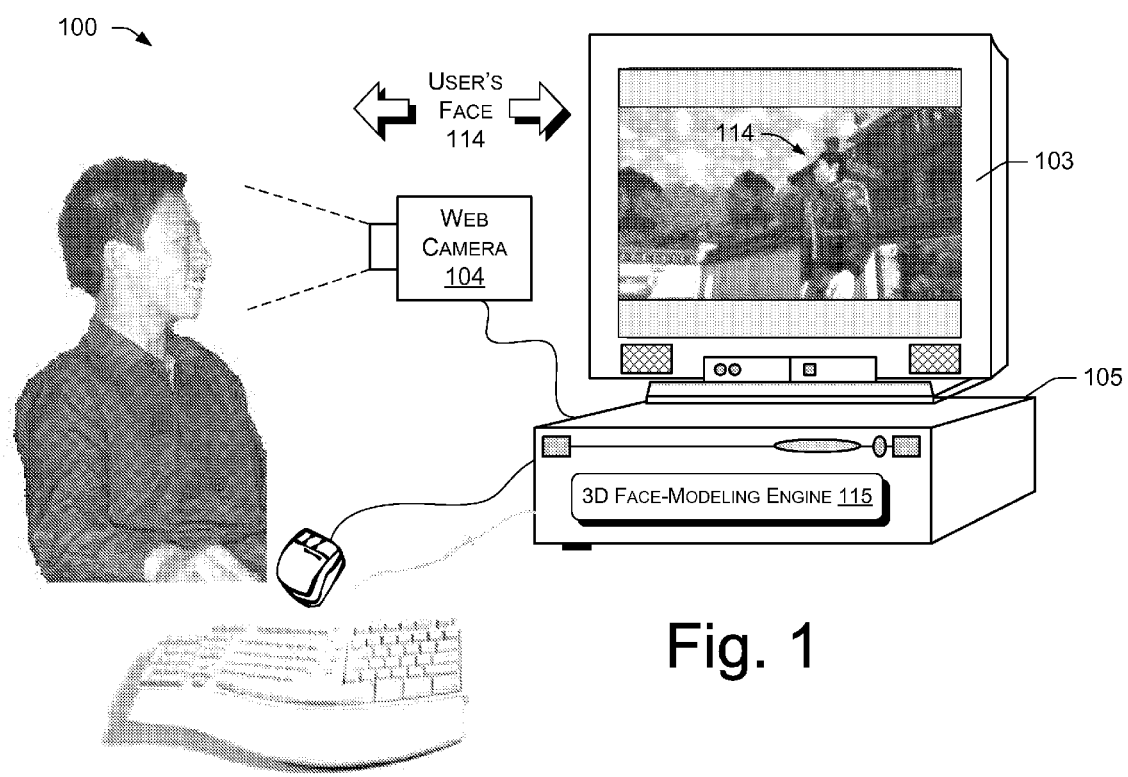
FIG. 1 is a diagram of an example environment for automatic 3D face modeling.

FIG. 1 shows an example system environment 100 in which the exemplary automatic 3D face-modeling can be used. A user 102 creates the brief video clip 104 via a camera, such as an inexpensive webcam 106. The video clip 104 includes a frontal view of the user's face 108 changing to a sideways profile view of the user's face 108 (or head). The video clip 104 may be so brief as to be considered a quick scan of the user's face from a frontal perspective and then from a side perspective. An exemplary 3D face-modeling engine 110 hosted on a computing device 112 receives the video clip 104 and efficiently produces a dynamic and accurate 3D face model, complete with texture attributes, which can be incorporated into gaming (and other) applications, such as a game to be shown on a display 114.

Exemplary Engine

Figure 2:
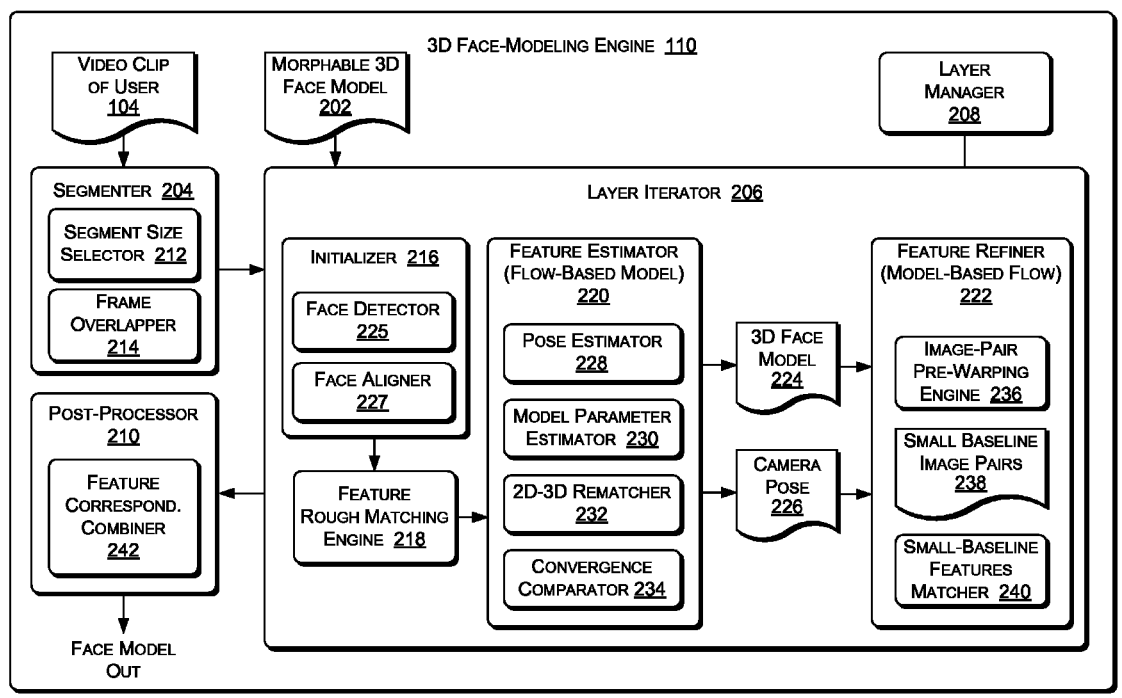
FIG. 2 is a block diagram of an exemplary 3D face-modeling engine.

FIG. 2 shows the exemplary 3D face-modeling engine 110 of FIG. 1 in greater detail. The illustrated configuration of the 3D face-modeling engine 110 is only one example arrangement. Many other arrangements of the illustrated components, or other similar components, are possible within the scope of the subject matter. At least some components of the exemplary 3D face-modeling engine 110 can be executed in hardware, software, or combinations of hardware, software, firmware, etc.

The exemplary 3D face-modeling engine 110 (or just "engine 110") includes a buffer or an input for the aforementioned video clip 104 of the user 102. The exemplary 3D face-modeling engine 110 also includes or communicates with a morphable 3D face model 202, which can be a conventional "3D mesh" model that begins as a generic 3D face mesh that is changeable into a universe of other 3D faces by providing enough parameters to adjust the various "triangular grids" making up the 3D model.

The exemplary engine 110 also includes a segmenter 204, a layer iterator 206 to estimate and refine 3D facial parameters for each segment and then for the entire video clip 104, a layer manager 208, and a post-processor 210.

Within the segmenter 204, a segment size selector 212 and a frame overlapper 214 determine the frames of the video clip 104 to constitute each segment of the video clip 104.

The layer iterator 206 recursively estimates and refines 2-dimensional (2D) feature matching, 3D head pose, and underlying 3D face shape. The illustrated layer iterator 206 includes an initializer 216, a "rough" feature matching engine 218, a feature estimator 220, and a feature refiner 222. A 3D face model 224 "in-the-making" and a camera pose 226 lie intermediate between the feature estimator 220 and the feature refiner 222.

The initializer 216 further includes a face detector 225, which may comprise a conventional face detection technique, and a face aligner 227.

The feature estimator 220 may further include a (head) pose estimator 228, a model (deformation) parameter estimator 230, a 2D-3D re-matcher 232, and a convergence comparator 234.

The feature refiner 222 may further include an image-pair pre-warping engine ("pre-warping engine 236"), a buffer for small baseline image pairs 238, and a small baseline features matcher 240.

The post-processor 210 may further include a feature correspondences combiner 242, which may use iterations of the feature estimator 220 and the feature refiner 222 to accomplish its task.

A conventional model may be used for the morphable 3D face model 202, as mentioned above, such as that proposed in V. Blanz and T. Vetter, "A morphable model for the synthesis of 3d faces," *Proc. SIGGRAPH*, pp. 187-194, 1999. A consideration when face-modeling from the video clip 104 is how to match the generic morphable 3D face model 202 to all frames of the video clip 104 accurately and in an automatic and efficient way. Because the exemplary 3D face-modeling engine 110 uses much shape information from the frames in frontal view and profile view, the 3D face shape can be precisely reconstructed. The coordinate system of the morphable 3D model 202 is assumed fixed in 3D, which coincides with using a fixed camera position (and moving the user's head) to create the video clip 104.

The segmenter 204 divides the entire video clip 104 into segments and computation is then processed in all segments recursively. The initializer 216 finds and aligns the face 108 in at least the first segment to be processed. The feature rough matching engine 218 produces rough feature matching results. Then computation in each segment consists of two iterative estimation processes that are started after the initialization and rough feature matching in that segment.

When the layer manager 208 initiates a first layer iteration, the flow based model used by the feature estimator 220 estimates and refines the motion parameters of each input face image and the 3D face shape. The optimization effected in the feature estimator 220 may integrate batch processing and model-based bundle adjustment, which results in robust 3D information recovery from the video clip 104.

Then, the feature matching is refined by the model-based flow of the feature refiner 222, since the underlying 3D face model and camera poses for each frame are determined. The image pre-warping engine 236 pre-warps image pairs into small baseline image pairs 238 and searches under geometrical constraints to obtain a better feature matching result. 2D point matching, head poses, and the 3D face model are iteratively estimated and refined by the feature estimator 220 and the feature refiner 222. As a result, consistent feature correspondences across images in the frames of one segment can be accurately obtained.

When the layer manager 208 initiates a second layer iteration, the 3D face geometry and the motion parameters (head poses) are now more efficiently estimated in the feature estimator 220, but this time for each frame instead of each segment. When expanded to the entire video clip 104, the feature estimator 220 is able to efficiently estimate matched features across all the frames of the video clip 104 with adaptive refinement of face shape. Finally, the feature correspondences combiner 242 of the post-processor 210 combines together the refined correspondences of the features in each segment to further refine the 3D face model 224, e.g., using the same iterative feature estimator 220 and feature refiner 222 as were used in each separate segment.

With regard to the exemplary segmenter 204, because of self-occlusion and feature detection failure, a surface point can only be observed and detected in a subset of images. This is one reason why the segmenter 204 divides the entire video clip 104 into several or multiple segments. In one implementation, the frame overlapper 214 calculates segments such that there is one overlapped frame between successive segments, to propagate parameter values between consecutive segments.

In the segment size selector 212, the number of frames in each segment depends on the speed of object movement and illumination changes—in order to get enough feature correspondences to robustly recover the 3D face model 224 and camera poses 226. With more than two frames tracked at one time in each segment, the recovered 3D information using batch processing in the second layer iteration will be more reliable compared with that obtained from consecutive pairs. Furthermore, accurate and reliable correspondences across images will be established under the exemplary two layer iteration. Consequently, in the first frame of the current segment (i.e., the last frame of the previous segment) the pose parameter computed from the previous segment is reliable for continuing feature tracking. This technique is more efficient than recursive processing of the same video clip 104 using images added iteratively at both ends, as in M. Dimitrijevic, S. Ilic, and P. Fua, "Accurate Face Models from Uncalibrated and Ill-Lit Video Sequence," *Proc. IEEE CVPR*, pages 188-202, 2004.

Regarding the exemplary initializer 216, to make the 3D face-modeling engine 110 fully automatic, the initializer 216 automatically obtains an initial pose for the first frame of each segment. For the very first segment of the video clip 104, the first frame contains a face view that is approximately frontal. The initializer 216 automates initialization of the frontal face view by detecting the facial region using a face detector such as that in R. Xiao, L. Zhu, and H. J. Zhang, "Boosting Chain Learning for Object Detection," *Proc. ICCV*, pages 709-715, 2003. The face aligner 227 then extracts salient facial features (c.f., Y. Zhou, G. Lie, and H. J. Zhang, "Bayesian tangent shape model: Estimating shape and pose parameters via Bayesian inference," *Proc. IEEE CVPR*, pages 16-22, 2003).

The initializer 216 then establishes semantic 2D-3D feature correspondences and uses, for example, the POSIT technique to obtain an approximate initial face pose (c.f., D. DeMenthon and L. S. Davis, "Model-based Object Pose in 25 Lines of Code," *Proc. ECCV*, pages 335-343, 1992). For other segments besides the first, the pose in the first frame of each succeeding segment is already known from the estimation result of previous segment. In one implementation, the face detector 225 and the face aligner 227 are not used again for the current video clip 104.

The feature rough-matching engine 218 selects relevant features in the first frame of each segment and then, for example, applies the KLT technique to give an initial feature matching result (c.f., J. Shi and C. Tomasi, "Good Features to Track," *Proc. IEEE CVPR*, pages 593-600, 1994).

Exemplary Feature Estimator—Processing Considerations

The exemplary feature estimator 220, a "flow-based model" module, efficiently recovers 3D face geometry and motion parameters in each frame, under the perspective projection camera model. "Flow-based" means that the feature estimator 220 uses data that is based on optical flow, where optical flow can be thought of as a velocity field in an image by which the image is transformed into the next image in a video sequence. Optical flow considers the motion of visual objects within a visual representation, where the motion is represented as vectors originating and terminating at particular pixels in frames of a video sequence. Optical flow-based processes are generally very sensitive to noise, yet the exemplary 3D face modeling engine 110 as a whole is very tolerant of noise, as will be described with respect to FIG. 7 below.

First, a working version of the morphable 3D face model 202 is constructed, for example, using the USF Human ID 3D database, which includes one-hundred laser-scanned heads (Univ. of Southern Florida, Tamp). Each face model in the database has approximately 70,000 vertices. In one implementation, the 3D face-modeling engine 110 uses only approximately 9000 vertices for better performance, which is still a fine approximation to the "ground truth" 3D face surface. The triangulated mesh structure of a 3D face is represented by a shape vector, $S=(V_1^T, \ldots, V_N^T)$, where $V_i$ (i=1, ..., N) are the vertices of the mesh, thus S is obtained by concatenating the X, Y, and Z coordinates of all its vertices. Then a new face shape S can be expressed as in Equation (1):

$$S = \bar{S} + \sum_{k=1}^{r} \alpha_k S_k, \quad (1)$$

where $\bar{S}$ represents an average face model, $S_k$ are orthogonal vectors, and $\alpha_k$ are scalar per orthogonal-vector weights that indicate the contributions of the shape deformation to each shape. A face is thus a surface defined by a set of r parameters, denoted by $b=\{\alpha_k|k=1, \ldots, r\}$, called model parameters. In one implementation, the number of model parameters r is 50, so a small number of observation data are enough to compute the model parameters of eigenvectors used in the calculations, and then the 3D face shape is created using those parameters.

Facial features are selected and tracked in n frames at one time in each segment. In one implementation, the feature estimator 220 sets n=3 without loss of generality. Then, there are corresponding feature sets $p_{j,0}$; $p_{j,1}$; $p_{j,2}$ for the three frames, in which for $p_{j,i}$, the term j is an index over 3D points, and i is an index over frames. A 3D point $S_j$ in the facial surface is computed by back-projecting $p_{j,0}$ based on the initial pose estimates $M_0$ in the first frame. The 3D point $S_j$ is on the l-th planar facet in the triangulated mesh structure of the morphable 3D face model 202. With the correct camera poses $M_1$ and $M_2$ in the last two frames, the $p_{j,1}$ and $p_{j,2}$ can be predicted based on the 3D point. Since the face shape is represented by a triangular mesh, any point on one of the triangles is a linear combination of the three triangle vertices, which is a function of model parameters, and any point on a triangle is also a function of model parameters. So the optimization function in one tracking segment can be formulated as in Equation (2):

$$F_1 = \min \sum_j \Psi(p_{j,0}, p_{j,1}, p_{j,2}, M_0, M_1, M_2, b)^2, \quad (2)$$

where $\Psi$ is the essential optimization function for one feature matching result in this segment, which can be implemented using the re-projection constraint. It can be assumed that the index of the planar facet is not changed when the 3D point $S_j$ is refined with the model parameters b, until the 2D-3D re-matcher 232 performs.

In one implementation, the re-projection error in the second image $\Sigma_j d(\tilde{p}_{j,i}, H\tilde{p}_{j,i+1})^2$ is used as a unit cost function that may be minimized in order to estimate parameters for over-determined solutions. Then, Equation (3):

$$H = A_{i+1}(R_{i,i+1} - t_{i,i+1} \bar{n}^T/d) A_i^{-1} \quad (3)$$

is the general expression for the homography induced by the plane for two views defined by their relative motion. $R_{i,i+1}$; $t_{i,i+1}$, $A_i$, and $A_{i+1}$ are camera intrinsic parameters; $\pi = (\tilde{n}^T, d)^T$ is a plane intrinsic parameter; $\tilde{p}$ represents homogenous coordinates of p; $\alpha$ denotes equality up to a scale (c.f, R. Hartley and A. Zisserman, *Multiple View Geometry in Computer Vision*, Cambridge University Press, 2000.

In one implementation, re-projection is simplified by assuming that points in the first frame are noise-free, the point-matching of two image pairs in one segment are allocated as $p_{j,0} \leftrightarrow p_{j,1}$ and $p_{j,0} \leftrightarrow p_{j,2}$ instead of as correspondences in the consecutive pairs. The location of $p_{j,0}$, determined by well-applied feature selection, is more robust than that of $p_{j,1}$ and $p_{j,2}$. So, the optimization function in one tracking segment can be formulated as in Equation (4):

$$F_1 = \sum_j d(\tilde{p}_{j,0}, H_{j,1}\tilde{p}_{j,1})^2 + d(\tilde{p}_{j,0}, H_{j,2}\tilde{p}_{j,2})^2 \quad (4)$$

Not all possible values of model coefficients are acceptable. Based on the PCA dimensionality reduction algorithm, it is necessary to impose constraint making parameters subject to bounds: $|\alpha_k| < 3\sigma_k$, where $\sigma_k$ is the k-th eigenvalue. In practice, the feature estimator 220 may add the regularization term σ instead of using constrained optimization techniques. The final function to be minimized by an IRLS (iterative reweighed least square) procedure way is, as shown in Equation (5):

$$F_1 + \sigma'^2 \sum_{k=1}^{r} \frac{\alpha_k^2}{\sigma_k^2}, \quad (5)$$

where σ' is adaptively determined for better performance, e.g., by the model parameter estimator 230.

In this manner, the exemplary optimization function can be used recursively in each segment of the entire video clip 104 with correspondences refined by the feature refiner 222 to be discussed further below. Components of the layer iterator 206, including the feature estimator 220, are now described.

The feature estimator 220 efficiently estimates the 3D face geometry and the six free degree motions for each frame. The pose estimator 228 reliably estimates the camera pose even before an accurate face model has been obtained. Moreover, the face geometry at this point does not have much discrepancy in the proximate segment because of the recursive processing of all the segments. Thus, the optimal value of each camera pose in each segment can be computed as in Equation (6):

$$(\hat{M}_0, \hat{M}_1, \hat{M}_2) = \arg\min_{M_0, M_1, M_2} F_1. \quad (6)$$

The accuracy of the 3D shape estimation from homography constraints increases with the number of correspondences (as demonstrated in M. Dimitrijevic, S. Ilic, and P. Fua, "Accurate Face Models from Uncalibrated and Ill-Lit Video Sequence," *Proc. IEEE CVPR*, pages 188-202, 2004). But the computational intensity of the nonlinear estimation problem increases quickly at the same time.

In one implementation, the major computational cost under a Levenberg-Marquardt optimization framework comes from the computation relative to a Jacobi matrix (J and $J^T J$). Fortunately, the computation of J relative to different pose parameters is independent, so J is a matrix having high sparse structure, such as in Equation (7):

$$\begin{bmatrix} J_{0,1}^0 & J_{0,1}^1 & 0 & 0 & 0 \\ J_{0,2}^0 & 0 & J_{0,2}^2 & 0 & 0 \\ 0 & 0 & J_{2,3}^2 & J_{2,3}^3 & 0 \\ 0 & 0 & J_{2,4}^2 & 0 & J_{2,4}^4 \end{bmatrix} \quad (7)$$

Equation (7) shows the sparse structure of J when tracking five frames in two segments and three frames in one segment. This can be performed over both of the two segments for further face model refinement, by the post-processor 210. For one segment, the sparse structure is similar. A simple block use indicator as an early exit mechanism for matrix multiplication greatly accelerates the computation. With this acceleration process, the exemplary two layer iterative process can be carried out efficiently.

Given the estimated camera poses from the pose estimator 228, the model parameter estimator 230 can more reliably estimates parameters. For greater smoothness of the surface recovery in the estimation of the face shape geometry, a regularization term is also helpful. The optimal value of model coefficients can be computed as in Equation (8):

$$\hat{b} = \arg\min_b \left( F_1 + \sigma'^2 \sum_{k=1}^{r} \frac{\alpha_k^2}{\sigma_k^2} \right), \quad (8)$$

where the regularization term σ' is determined adaptively as in Equation (9):

$$\sigma_k'^2 = \frac{F_1/m}{\sum_{k=1}^{r} \frac{\alpha_k^2}{\sigma_k^2} / r}, \quad (9)$$

where m is the total number of the feature matches in this segment.

The regularization term is used to normalize the dimension size of the two terms when minimizing the objective function. In one implementation, the adaptive regularization term is applied after the objective function is decreased in the first several optimization iterations. In one implementation, the minimum value of the regularization term is set to maintain the power of the regularization term in smoothing the face surface.

The 2D-3D re-matcher 232 changes the 2D-3D correspondences, the index of the corresponding planar facet, with the change of 3D face geometry. In this manner, convergence can be assured by the convergence comparator 234. In one implementation, the 2D-3D re-matcher 232 interleaves its processing alternately with the pose estimator 228 and the model parameter estimator 230 for stable convergence.

Figure 3:
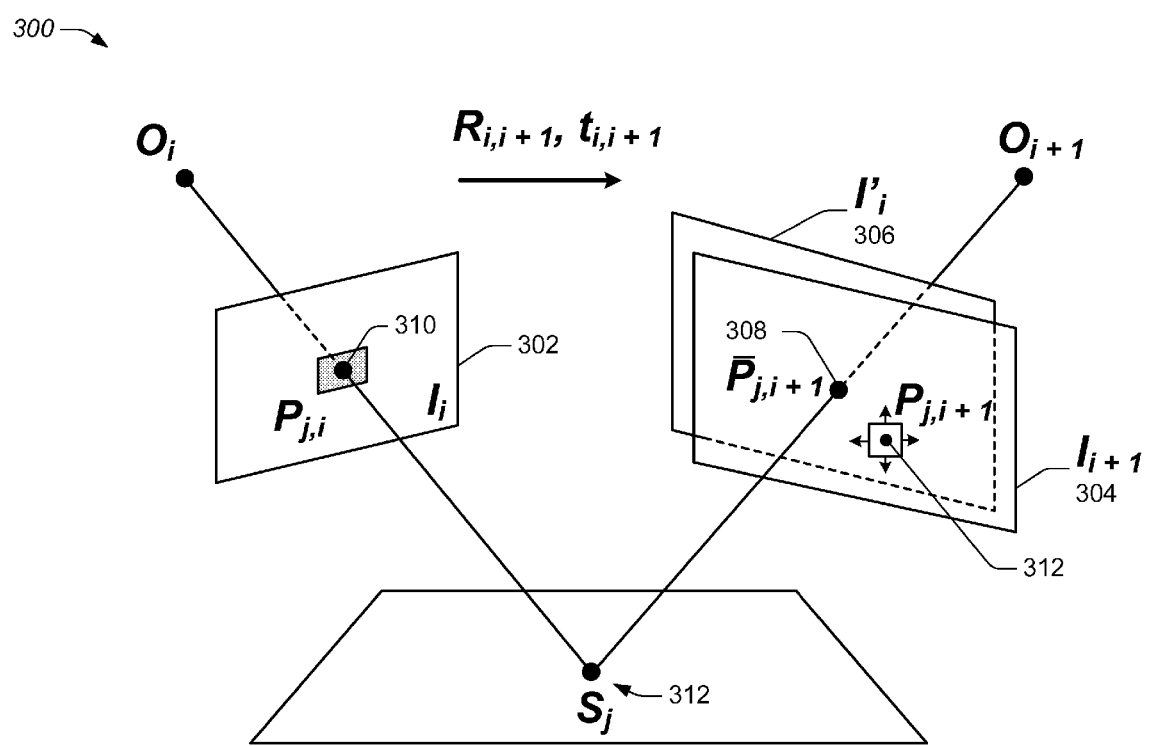
FIG. 3 is a diagram of exemplary model-based feature matching.

FIG. 3 shows exemplary model-based feature matching 300 used by the feature refiner 222. "Model-based" flow means that at least a rough face shape (model) is already known and prediction is made (or refined) with feature-based data. In the model-based flow used by the feature refiner 222, image features are constrained by the geometry of the underlying 3D face shape. The feature refiner 222 uses such constraints to handle perspective distortion within a correction window when there is large degree of rotation in referenced images. Matching between relatively wider baseline images reduces the total number of features and thus improves the efficiency of the feature refiner 222.

FIG. 3 thus shows this geometrically constrained feature matching process 300 for refining feature correspondence in image $I_i$ 302 and $I_{i+1}$ 304. After the optimization wrought in the flow-based feature estimator 220, a rough 3D face model 224 and head poses 226 are obtained for each frame. In one implementation, with a dense mesh structure of the reconstructed face model, the image pair pre-warping engine 236 first pre-warps $I_i$ 302 to $I'_i$ 306. The small baseline features matcher 240 matches features in the new small baseline image pairs 238, i.e., $I'_i$ 306 and $I_{i+1}$ 304. The location of the feature image window $\overline{P}_{j,i+1}$ 308 in the frame $I_{i+1}$ 304 can be predicted based on transfer relation between $P_{j,i}$ 310 and $P_{j,i+1}$ 312 under the same back-projected 3D points $S_j$ 314 in the refined 3D face model 224. Then, the small-baseline features matcher 240 performs a block matching search in the neighborhood of the window in $I_{i+1}$ 304, denoted as a confidence region, based on the new narrow baseline pair $I'_i$ 306 and $I_{i+1}$ 304. In one implementation, since block matching can be done approximately over integer image coordinates, no image interpolation is needed and the resulting operation is extremely efficient.

Exemplary Performance

The exemplary 3D face-modeling engine 110 works efficiently with both unperturbed video sequences and noisy video sequences, and provides robust performance to high noise levels.

Figure 4:
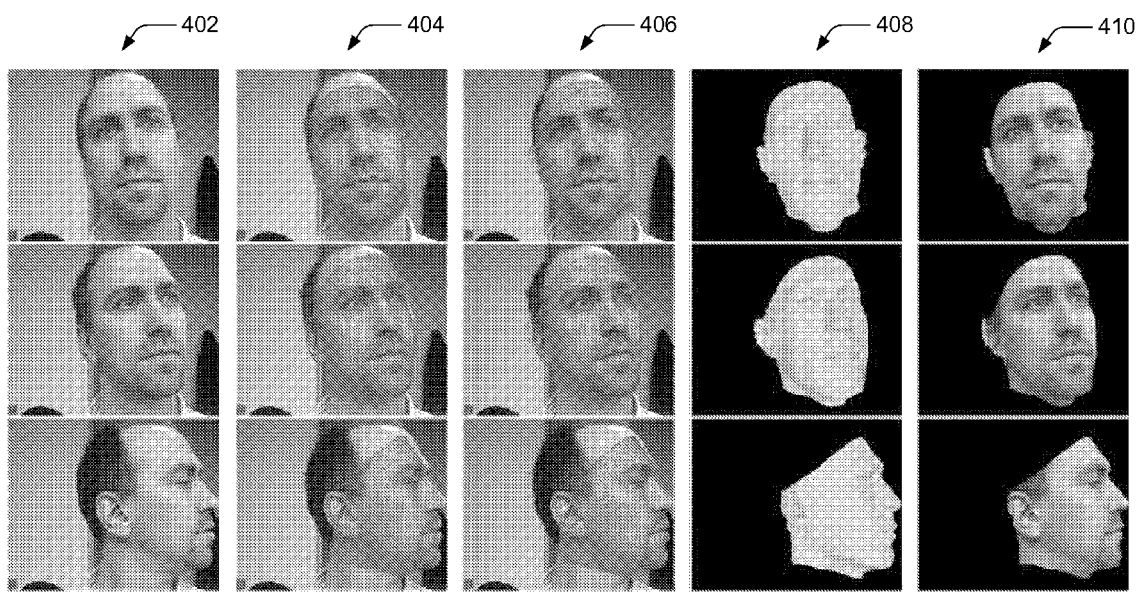
FIG. 4 is a diagram of example results obtained by the 3D face-modeling engine of FIG. 2, at different stages of iterative feature estimation and refinement.
Figure 5:
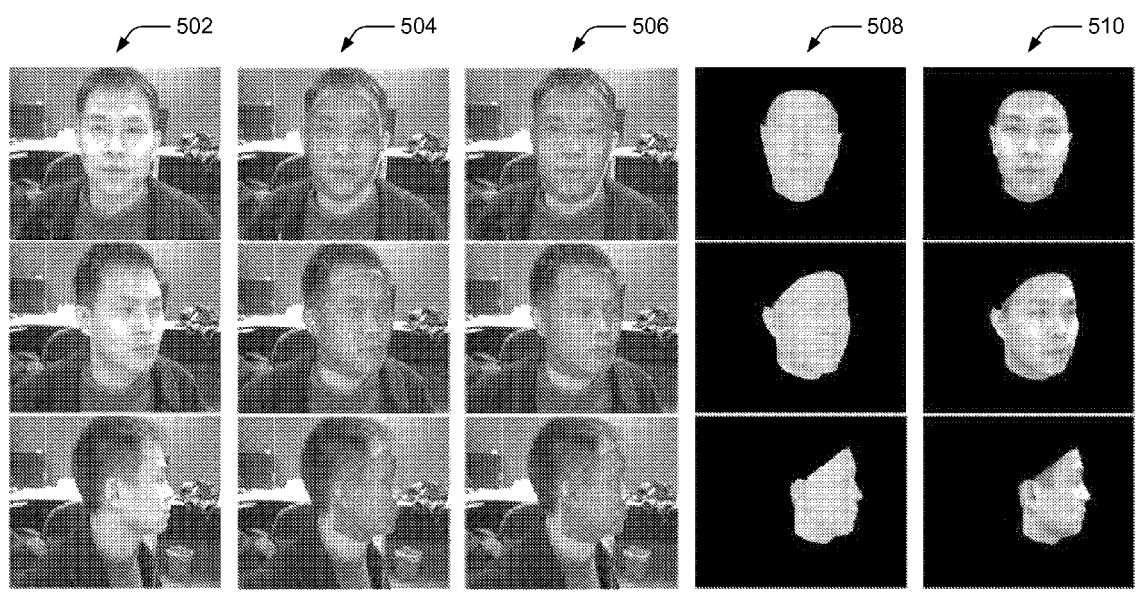
FIG. 5 is a diagram of example results obtained under uncontrolled lighting conditions by the 3D face-modeling engine of FIG. 2, at different stages of iterative feature estimation and refinement.

FIGS. 4 and 5 show results obtained from an actual video clip 104. In FIG. 4, the video clip 104 that is used is the shared sequence in Z. Zhang, Z. Liu, D. Adler, M. F. Cohen, E. Hanson, and Y. Shan, "Robust and Rapid Generation of Animated Faces from Video Images: A Model-Based Modeling Approach," *Technical Report MSR-TR*-01-101, Microsoft Research, 2001. In FIG. 5, the video sequence was captured in uncontrolled lighting conditions in a normal office environment using a low cost USB camera 106 and unrestricted head movement, for the comfort of the human subject. The video clip 104 can be obtained by capturing a head turn of the user in front of a static camera 106. A typical video clip 104 may contains 22 to 23 images or frames of resolution 640×480, for example. The first example shown in FIG. 4 has 22 frames in the video clip 104, and the second, shown in FIG. 5, has 23 frames.

In FIGS. 4 and 5, each left column contains three captured images having different degree of head rotation, approximately 0°, 45°, and 90°, respectively. The other images in each figure show example results: the second columns show projection of the recovered face models on the face images based on the estimated camera pose parameter for these images, only after the feature estimator 220 has acted (flow-based model tracking); the third columns show the same after three-time (3×) iteration of the feature estimator 220 (flow-based model) and the feature refiner 222 (model-based flow); the fourth columns show the shaded views of the reconstructed face model 224 in the same pose; and the fifth columns show the textured views of the reconstructed face model 224 in the same pose.

Thus, a first column 402 of FIG. 4 shows three captured images having different head rotation from front view to side view. The second column 404 shows the projection of the recovered face models on the face images based on the estimated camera pose parameters for these images after the flow-based model processing of the feature estimator 220. The third column 406 shows the projection of the face models after three-time (3×) iteration of both the feature estimator 220 (flow-based model) and the feature refiner 222 (model-based flow). The fourth column 408 shows the shaded views of the reconstructed face model 224 in the same pose. The fifth column 410 shows the textured views of the reconstructed face model 224 in the same pose.

In the results shown in FIG. 4, four images were processed in one segment at one time. In each segment, five-hundred feature points were selected in the first frame and tracked until the final frame of that segment was reached. Then the corresponding features across all frames were used for the shape model parameters and head motion parameters recovery. The known values of parameters computed in a previous segment were used for setting the initialization values of the non-linear optimization of Equation (5), in the current segment.

A first column 502 of FIG. 5 shows three captured images having different head rotation from front view to side view. The second column 504 shows the projection of the recovered face models on the face images based on the estimated camera pose parameters for these images after the feature estimator 220 (flow-based model) has acted. The third column 506 shows the projection of the face models after three-time (3×) iteration of both the feature estimator 220 (flow-based model) and the feature refiner 222 (model-based flow). The fourth column 408 shows the shaded views of the model in the same pose. The fifth column 410 shows the textured views of the face model in the same pose.

In the results shown in FIG. 5, the specification was changed to select and track three-hundred feature points in three images of one segment. In these example implementations, the layer manager 208 begins the second layer iteration for refining estimates—using both the flow-based model components and the model-based flow components to refine the point matching, head poses 226, and the 3D face model 224—only after all frames have already been processed using the flow-based model only, for better efficiency yet without sacrificing accuracy.

As shown in FIGS. 4 and 5, the accuracy of models produced by the 3D face-modeling engine 110 increases as more images are used and as a higher number of iterations of the layer iterator 206 are used. This is observable from the projections of the recovered model overlaid onto the images, especially the occluding contour, which the mouth region in side view particularly illustrates.

In one (non-optimized) implementation, the total running time of a three-time (3×) iteration of the feature estimator 220 and the feature refiner 222 as well as estimation of rough feature correspondences across all image pairs was about eight minutes on a 1.3 GHz CPU and 256M Memory PENTIUM 4 machine for the video clip 104 used in FIG. 4. For the video clip 104 in FIG. 5, the total running time was about six minutes on the same machine set-up.

Figure 6:
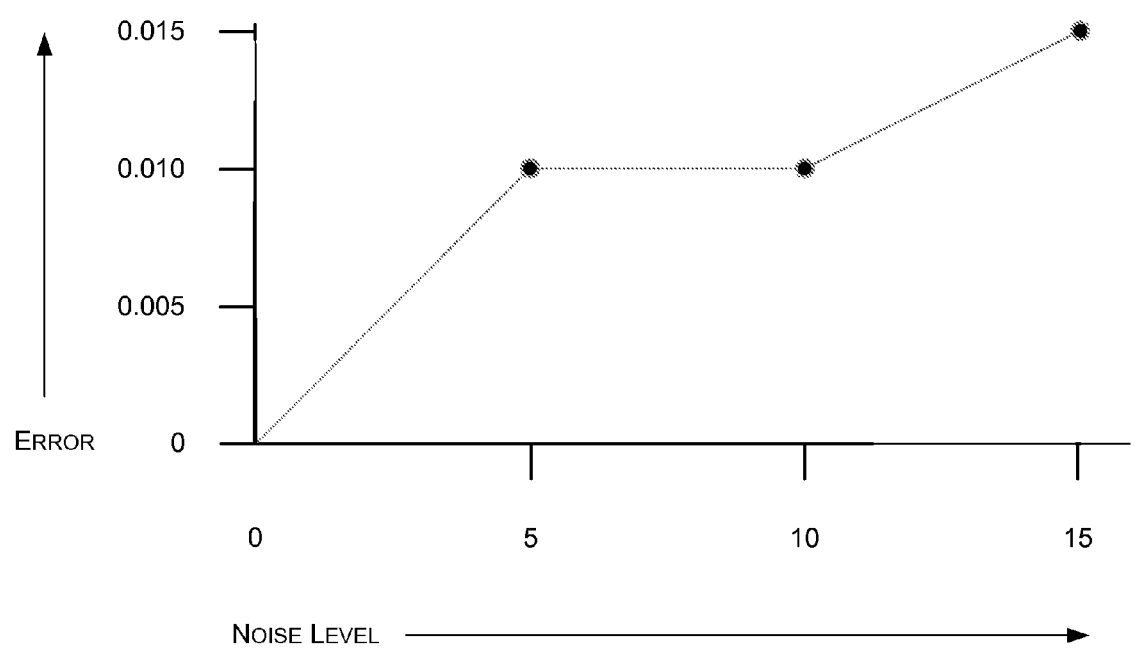
FIG. 6 is a diagram of the efficacy of the 3D face-modeling engine of FIG. 2, when video input is subjected to different levels of noise.

FIG. 6 shows the normalized difference between the reconstructed 3D face model 224 from noise-perturbed video as compared with noise-free video, with increasing noise level. Because the 3D face-modeling engine 110 includes a rough feature matching engine 218, noise perturbed video clips 104 can be used. These demonstrate the robustness of exemplary systems 100 for use with low quality image data. In the same video clip 104 as used for FIG. 4, noise is added with standard deviations of 5%, 10% and 15% of the range of gray value, for creating the data of FIG. 6.

As shown, the 3D face-modeling engine 110 is tolerant of high noise levels while maintaining efficient operation. The horizontal axis is the standard deviation of the added noise. The vertical axis is the difference between the reconstructed model from noise-added video and the reconstructed model from noise-free video, which is normalized by the 3D size of the reference model. The average value of the difference of all model points is plotted.

Figure 7:
FIG. 7 is a diagram of example results obtained by the 3D face-modeling engine of FIG. 2, when video input is subjected to noise.

FIG. 7 shows example results obtained with a noise-perturbed video clip 104 described above. The same parameter settings are used as were used in FIG. 4 (except with noise added). A first column 702 of FIG. 7 shows three images of the same face as in FIG. 4, perturbed with a gray noise level of 15% in different head rotation positions. The second column 704 shows projection of a stage during recovery of the face model 224, shown overlaid on the images.

Exemplary Methods

Figure 8:
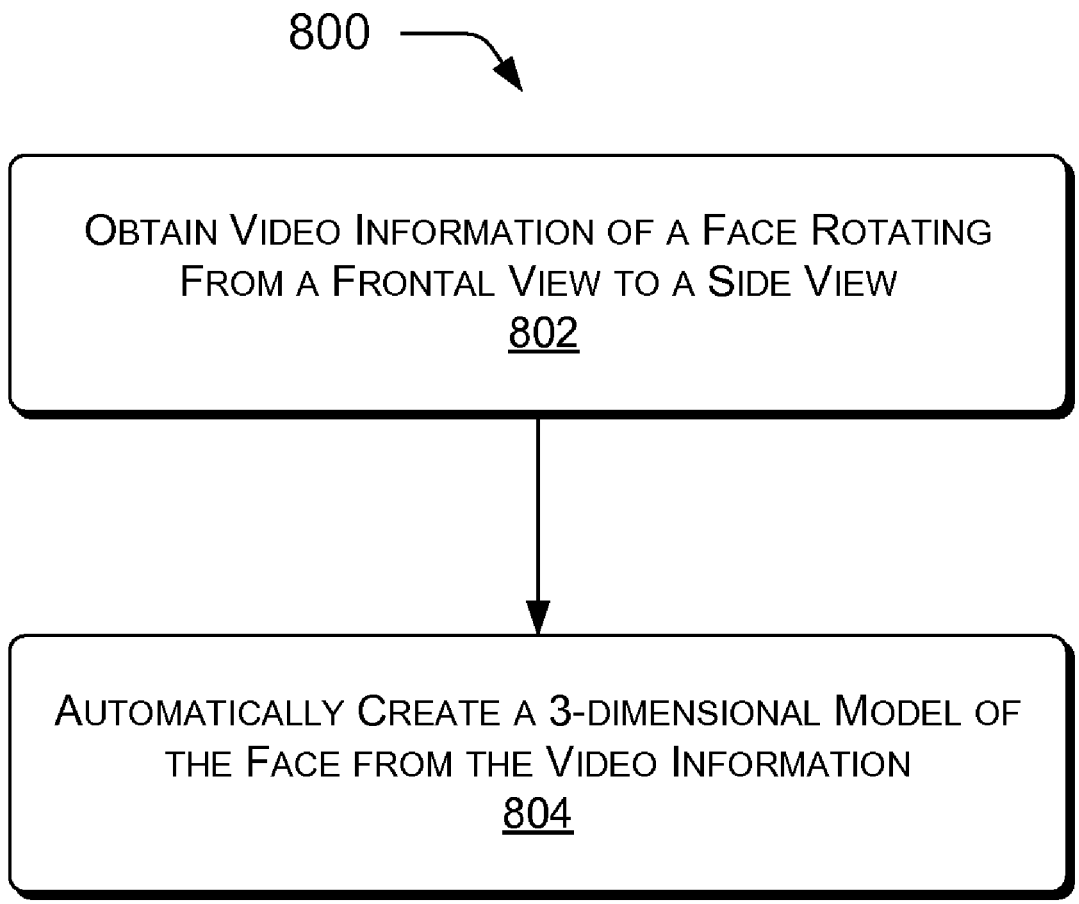
FIG. 8 is a flow diagram of an exemplary method of automatically obtaining a 3D face model from a video clip.

FIG. 8 shows an exemplary method 800 of automatically obtaining a 3D face model from a rough video clip. In the flow diagram, the operations are summarized in individual blocks. Depending on implementation, the exemplary method 800 may be performed by hardware, software, or combinations of hardware, software, firmware, etc., for example, by components of the exemplary 3D face-modeling engine 110.

At block 802, a brief video sequence, or clip, is obtained of a user's head and/or face. The video clip may be captured by an inexpensive webcam or USB camera, even under substandard lighting conditions. The video clip may be so brief as to be considered a quick scan of the user's face from a frontal perspective and then from a side view perspective.

At block 804, a 3D model of the face is automatically created from the video sequence. That is, the video is displayed 2-dimensionally, but since the 2-dimensional information portrays (in 2D) a 3D object rotating approximately 90 degrees, there is enough potential 3D information that a dynamic 3D model of the face or other 3D object can be derived, e.g., by feature matching between the two views or positions of the face. Exemplary feature matching is made accurate, efficient, and computationally feasible by iterating feature estimation and feature refinement. The exemplary method 800, including its initialization, is automatic given the video sequence.

Figure 9:
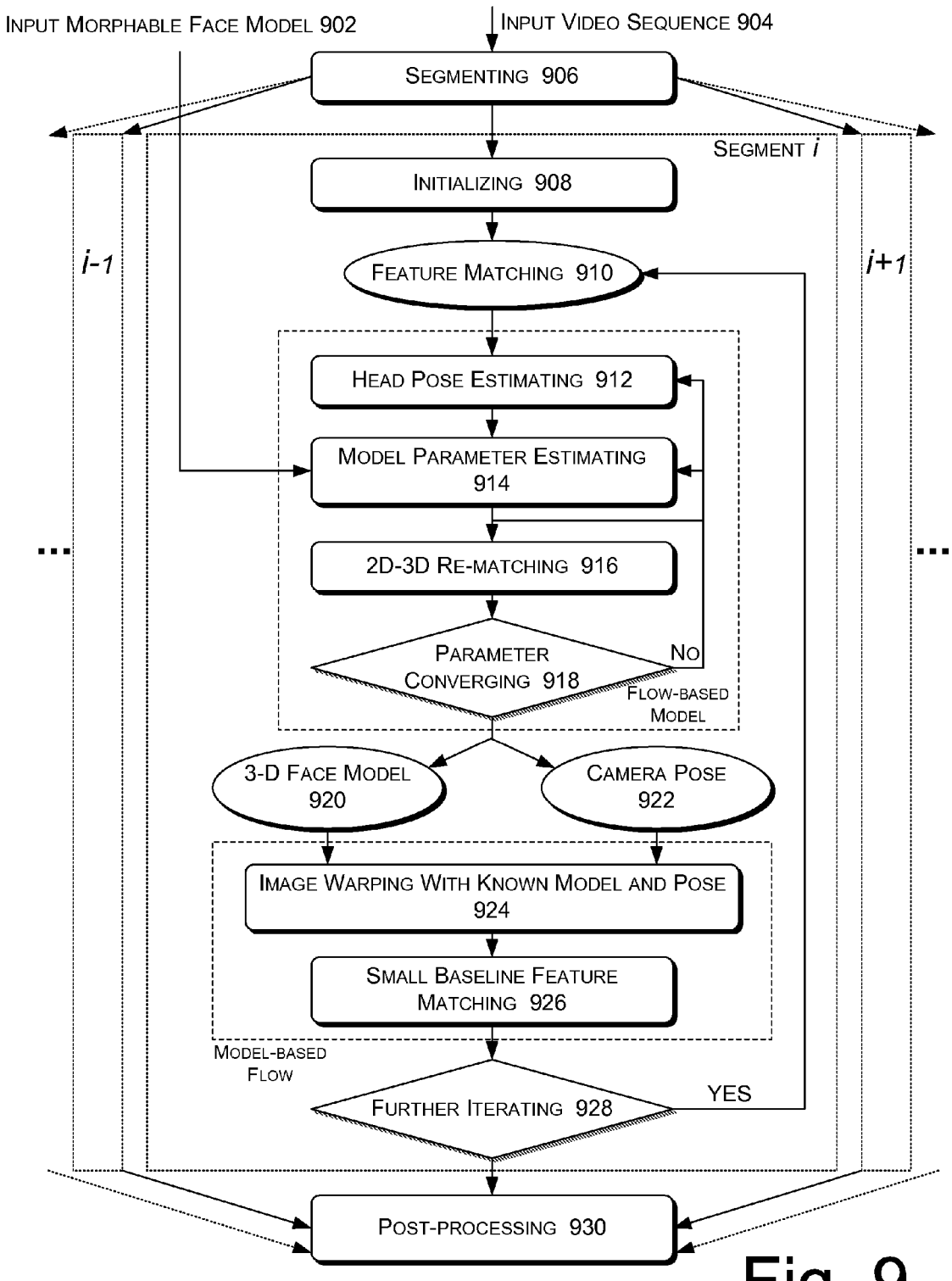
FIG. 9 is a flow diagram of an exemplary method of automatic 3D face modeling.

FIG. 9 shows an exemplary method 900 of automatic 3D face modeling. In the flow diagram, the operations are summarized in individual blocks. Depending on implementation, the exemplary method 900 may be performed by hardware, software, or combinations of hardware, software, firmware, etc., for example, by components of the exemplary 3D face-modeling engine 110.

First a generic or "stock" 3D morphable face model is input 902. The 3D morphable face model can assume the shape and features of many different faces, given particular values for parameters to define a given face.

Next, a video sequence of the face to be modeled, e.g., the user's face, is input 904. The video sequence includes a frontal view of the user's face thereafter rotating into a side view of the same user's face, e.g., before a fixed camera. The exemplary method 900 automatically matches the generic 3D morphable face model to all the frames in the input video sequence in an accurate and efficient manner.

At block 906, the video sequence of the user's face is segmented. By segmenting the video sequence into segments, model parameters for each segment can be iteratively achieved more quickly than trying to process the entire video sequence at once. The model parameters are first iteratively optimized for the relatively low number of frames of each segment, and then the model parameters are optimized across the segments. This two layer iterative technique results in speed and efficiency.

At block 908, the first process of initializing begins within individual segments. The computation is processed in all segments recursively as shown by the layout and flow of FIG. 9. The computation in each segment consists of two iterative estimation processes that are started after the initializing in that segment.

At block 910, rough feature matching allows the method 900 to create initial correspondences between features to overcome potential poor quality in the input video sequence and to obtain an initial set of values for beginning the iterative processes.

At block 912, at the beginning of the first layer iteration, the motion parameters of each input facial image and the 3D face shape begin to be estimated and refined in the "flow-based model" module, given the rough feature matching results. The first process aims to optimize the camera pose, given the rough feature matching results, e.g., according to Equations (6) and (7) described above.

At block 914, parameters are estimated for the 3D morphable face model. In one implementation, these parameters may be optimized with each iteration according to Equations (8) and (9) above.

At block 916, 2D-to-3D re-matching occurs. With each change of 3D face geometry, i.e., changes in 2D-3D correspondences, the index of the corresponding planar facet is updated to facilitate convergence of parameters.

At block 918, convergence of parameters is monitored to decide whether to perform more iterations within the optical flow-based steps of head pose estimating, model parameter estimating, and 2D-3D re-matching, just described. If parameter convergence is not satisfied, then the method 900 branches back to feature matching at block 910 for another iteration of the flow-based model steps. In one implementation, the optimizing that occurs in the illustrated flow-based steps integrates batch processing and model-based bundle adjustment, which results in robust 3D information recovery.

At blocks 920 and 922, if parameter convergence is satisfied at block 918, then the feature matching will be refined in the model-based flow module to be described in steps below, with (tentatively) known underlying 3D face model and camera poses for each frame (i.e., each frame in the current segment).

Blocks 924 and 926 constitute a model-based flow. At block 924, by pre-warping image pairs into small baseline image pairs and searching under geometrical constraints, a better feature matching result is be obtained.

At block 926, small-baseline feature matching is performed. In this manner, 2D point matching, head poses, and the 3D face model are iteratively refined. As a result, consistent correspondences across images in one segment are accurately obtained.

At block 928, the number of iterations is determined, for example, by parameter convergence, by set number, or by comparison of results with a threshold. When further iterations within the segments are to occur, the method 900 branches to the beginning step of feature matching at block 910, using improved input values for the method 900 with each iteration. Thus, rapidly improving results are recursively achieved in all segments.

At block 930, post-processing steps that constitute a second iterative layer propagate the results achieved for the multiple segments of the video sequence, for each frame of the entire video sequence. That is, in the second layer iteration, the 3D face geometry and the motion parameters (head poses) for each frame are estimated efficiently in the flow-based model module. When expanding to the entire sequence, the feature matching can be efficiently estimated across all frames with adaptive refinement of face shape. The refined feature correspondences for each segment are combined together in the last post-processing step to further refine the 3D face model, using the same or similar estimation and refinement process as used in each segment. In other words, the same iterative feature estimating and feature refining that were used with segments are used now, except that in this second iterative layer, instead of operating on frames of a segment, the method 900 operates analogously on segments of the entire video sequence, thereby providing model parameters for each frame of the video sequence.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   under control of one or more processors executing computer-executable instructions:
      receiving video information of a face rotating from a front view position to a side view position;
      creating a 3-dimension model of the face at least based in part on the video information, the creating including:
         dividing the video information into a plurality of segments; and
         calculating a length of each segment such that upon dividing the video information, the plurality of segments comprise at least one frame overlapping between successive segments for continued feature tracking.

2. The method as recited in claim 1, wherein receiving video information comprises capturing a video clip of the face under variable or poor lighting conditions.

3. The method as recited in claim 1, wherein automatically creating a 3-dimension model of the face includes deriving values for parameters of a morphable 3D face model.

4. The method as recited in claim 1, further comprising performing an automatic initialization to obtain a rough initial face pose.

5. The method as recited in claim 1, wherein creating a 3-dimension model of the face further comprises:
   for each segment, to simultaneously estimate 2-dimensional feature matches, at least one 3-dimensional head pose, and at least one 3-dimensional face shape within each segment, iterating between:
      estimating features of the face across frames of the segment;
      refining the features across frames of the segment using the estimated features;
   iteratively optimizing the estimating features and the refining features according to a re-projection constraint; and
   iteratively combining feature correspondences across the segments to obtain 2-dimensional feature matches, at least one 3-dimensional head pose, at least one 3-dimensional face shape, and at least one facial texture for the face in all the segments of the video information.

6. The method as recited in claim 5, wherein the estimating features overcomes errors in the video information due to noise-perturbation or poor illumination of the face.

7. The method as recited in claim 5, wherein combining feature correspondences across segments approximately uses the estimating features and the refining features that is used for each segment.

8. The method as recited in claim 5, wherein the estimating features comprises a flow-based model process.

9. The method as recited in claim 5, wherein the estimating features comprises a flow-based model process that includes:
   iteratively estimating a head pose;
   iteratively estimating values for parameters of a morphable 3D face model; and
   iteratively performing 2-dimensional to 3-dimensional feature re-matching or iteratively performing 2-dimensional to 3-dimensional point re-matching.

10. The method as recited in claim 5, wherein the refining features comprises a model-based flow process.

11. The method as recited in claim 5, wherein the refining features comprises a model-based flow process that includes:
    iteratively image warping with estimated model parameters and estimated pose parameters; and
    iteratively performing small baseline feature matching.

12. The method as recited in claim 5, wherein at least combining feature correspondences across the segments uses a sparse bundle adjustment to accelerate computation.

13. A 3-dimensional face-modeling engine, comprising:
    a segmenter to divide a video sequence of a face rotating from a frontal view to a side view into segments;
    a frame overlapper to calculate a length of each segment such that upon dividing the video sequence, the segments comprise at least one frame overlapping between successive segments for continued feature tracking;
    an iterator to iteratively estimate and iteratively refine facial features across images of each segment; and
    a post-processor to combine the facial features across the segments for the entire video sequence to obtain 2-dimensional feature matches, at least one 3-dimensional head pose, at least one 3-dimensional face shape, and at least one texture for the face.

14. The 3-dimensional face-modeling engine as recited in claim 13, wherein the iterator includes:
    a feature estimator comprising flow-based model components; and
    a feature refiner comprising model-based flow components.

15. The 3-dimensional face-modeling engine as recited in claim 14, wherein the feature estimator includes:
    a pose estimator;
    a model parameter estimator; and
    a 2-dimensional to 3-dimensional feature re-matcher.

16. The 3-dimensional face-modeling engine as recited in claim 14, wherein the feature refiner includes:
    an image-pair pre-warping engine; and
    a small-baseline features matcher.

17. The 3-dimensional face-modeling engine as recited in claim 13, further comprising an initializer to detect a face in a first frame of at least one of the segments and to extract facial features of the detected face.

18. The 3-dimensional face-modeling engine as recited in claim 13, wherein at least the post-processor uses a sparse bundle adjustment to accelerate computations.

19. The 3-dimensional face-modeling engine as recited in claim 13, wherein the iterator uses an optimization that includes a re-projection constraint.

20. A system, comprising:
    means for receiving video information of a face rotating from a frontal view to a side view;
    means for creating a 3-dimension model of the face based at least in part on the video information, the means for creating including:
       means for dividing the video information into a plurality of segments; and
       means for calculating a length of each segment such that upon dividing the video information, the plurality of segments comprise at least one frame overlapping between successive segments for continued feature tracking.

* * * * *